United States Patent
Nakata et al.

[11] Patent Number: 6,088,874
[45] Date of Patent: Jul. 18, 2000

[54] GROMMET

[75] Inventors: Hiroomi Nakata; Toru Makabe, both of Hiroshima, Japan

[73] Assignee: Yazaki Corporation, Tokyo, Japan

[21] Appl. No.: 09/064,105

[22] Filed: Apr. 22, 1998

[30] Foreign Application Priority Data

Apr. 22, 1997 [JP] Japan ................................ 9-104714

[51] Int. Cl.⁷ .................... H02R 3/22; F16L 5/00
[52] U.S. Cl. .................. 16/2.1; 16/2.2; 174/65 G; 174/153 G
[58] Field of Search ................. 16/2.1, 2.2, 2.5; 174/65 G, 151, 152 G, 153 G, 135; 248/56

[56] References Cited

U.S. PATENT DOCUMENTS

| | | | |
|---|---|---|---|
| 2,494,814 | 1/1950 | Huth | 174/70 R |
| 4,928,349 | 5/1990 | Oikawa et al. | 16/2 |

FOREIGN PATENT DOCUMENTS

| | | | |
|---|---|---|---|
| 5-47675 | 6/1993 | Japan | F16L 5/02 |
| 7-282666 | 10/1995 | Japan | H01B 17/58 |
| 7-296661 | 11/1995 | Japan | H01B 17/58 |

*Primary Examiner*—Anthony Knight
*Assistant Examiner*—Alison K. Pickard
*Attorney, Agent, or Firm*—Sughrue, Mion, Zinn, Macpeak & Seas, PLLC

[57] ABSTRACT

A grommet including a cylindrical wire fitting portion for fitting on and holding a wire harness passing therethrough, and a panel fitting portion of a substantially oval tubular shape for being elastically deformed to be fitted in a through-hole of an oval shape formed through a panel. Straight portions of an abutment flange portion of the panel fitting portion are convex to be larger in thickness than arcuate portions of the abutment flange portion. The panel fitting portion includes a slanting guide portion to be guided to the through-hole in the panel, a fitting groove to be fitted in the through-hole, and the abutment flange portion to be abutted against that portion of the panel around the through-hole, and straight portions of a distal end portion of the slanting guide portion are outwardly convex to be larger in thickness than arcuate portions of the distal end portion, and the straight portions of the abutment flange portion are outwardly convex to be larger in thickness than the arcuate portions of the abutment flange portion. The straight portions of the abutment flange portion are further inwardly convex to be further larger in thickness than the arcuate portions of the abutment flange portion.

5 Claims, 7 Drawing Sheets

GROMMET

BACKGROUND OF THE INVENTION

1. Field of the Invention

This invention relates to a grommet with an excellent waterproof ability used, for example, when a wire harness (i.e., a bundle of wires) for an automobile is passed through a panel.

2. Description of the Related Art

Figure 7A:
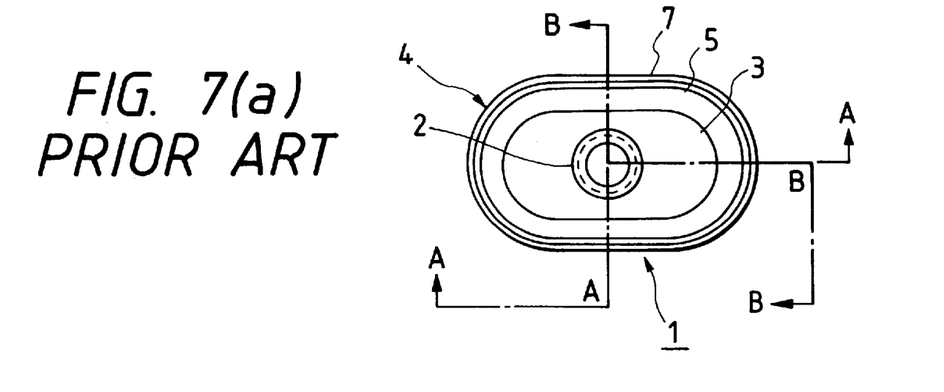
FIG. 7(a) is a rear view of a conventional grommet.
Figure 7B:
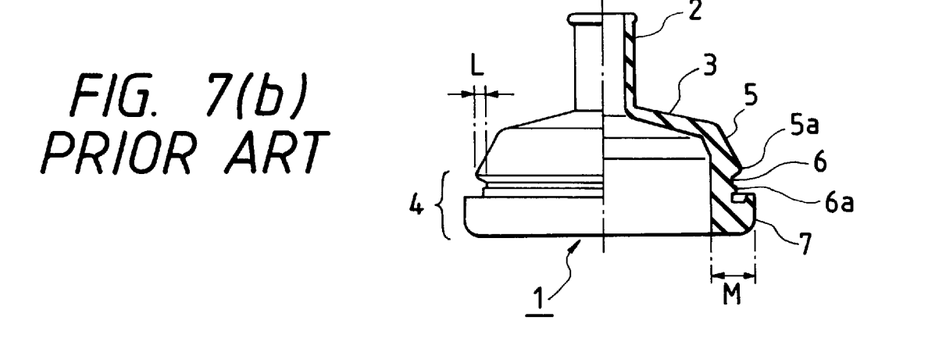
FIG. 7(b) is a cross-sectional view taken along the line A—A of FIG. 7(a)
Figure 7C:
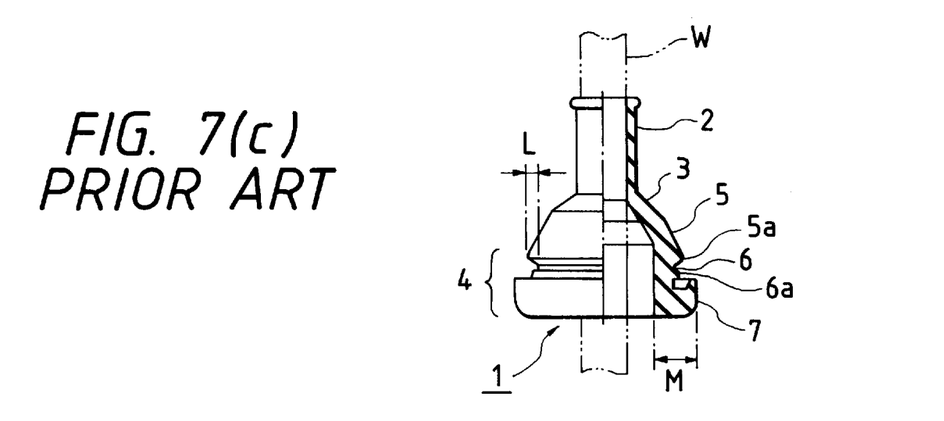
FIG. 7(c) is a cross-sectional view taken along the line B—B of FIG. 7(a)
Figure 8A:
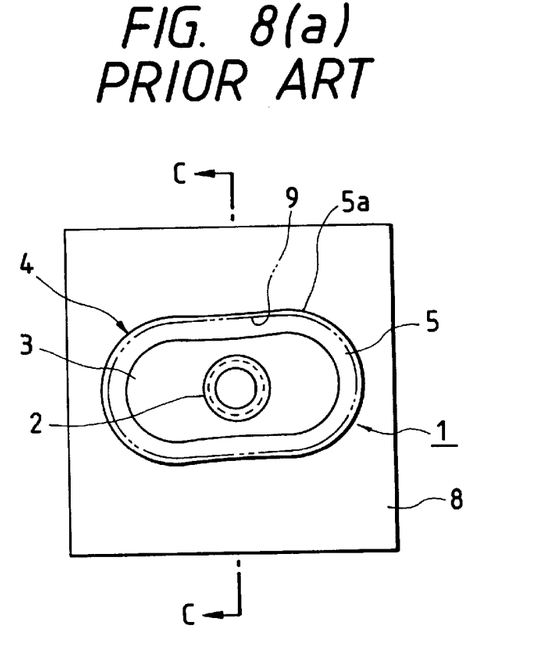
FIG. 8(a) is a rear view of the conventional grommet fitted in a through-hole in a panel.
Figure 8B:
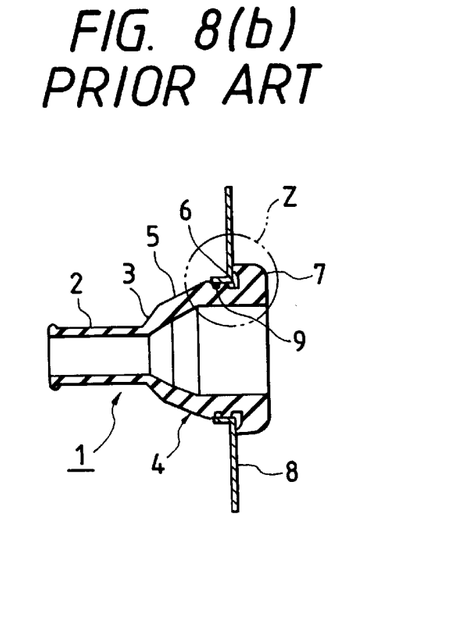
FIG. 8(b) is a cross-sectional view taken along the line C—C of FIG. 8(a)
Figure 8C:
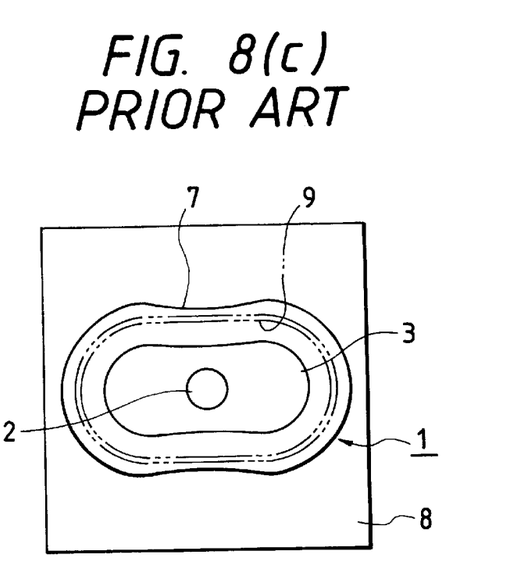
FIG. 8(c) is a front-elevational view of the conventional grommet fitted in the through-hole in the panel.
Figure 8D:
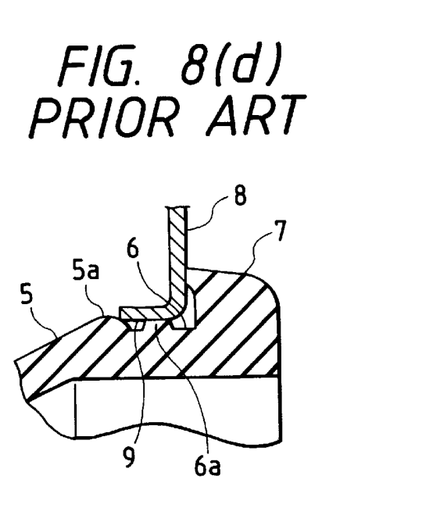
FIG. 8(d) is an enlarged, cross-sectional view of a portion Z of FIG. 8(b)

One known grommet of the type described is shown in FIGS. 7(a) to 7(c) and 8(a) to 8(d). As shown in FIGS. 7(a) to 7(c) and 8(a) to 8(d), this grommet 1 is integrally molded of a rubber material (soft elastic material), and includes a cylindrical wire fitting portion 2 for fitting on and holding a wire harness W passing therethrough, and a panel fitting portion 4 of a substantially oval tubular shape for being compressively elastically deformed to be fitted in a through-hole 9 of an oval shape formed through a panel 8. Straight portions (designated by P in FIG. 9) of the panel fitting portion 4 are equal in thickness to arcuate portions (designated by Q in FIG. 9) thereof. Namely, the panel fitting portion 4 is formed integrally with the wire fitting portion 2 through a wall portion 3 of a substantially oval disk shape, and has a slanting guide portion 5 to be guided to the through-hole 9 in the panel 8, a fitting groove 6 to be fitted in the through-hole 9, and an abutment flange portion 7 to be abutted against that portion of the panel 8 around the through-hole 9. The thickness of the straight portions P of the slanting guide portion 5 at its distal end 5a is equal to the thickness of the arcuate portions Q at the distal end 5a (that is, they have the same thickness L between the bottom surface of the fitting groove 6 and the distal end 5a as shown in FIGS. 7(b) and 7(c)). Also, the thickness (designated by M in FIG. 7(c)) of the straight portions P of the abutment flange portion 7 is equal to the thickness (designated by M in FIG. 7(b)) of the arcuate portions Q thereof. Techniques analogous to the above grommet 1 are disclosed in Japanese Utility Model Unexamined Publication No. Hei. 5-47675 and Japanese Patent Unexamined Publication Nos. Hei. 7-296661 and Hei. 7-282666.

Figure 9:
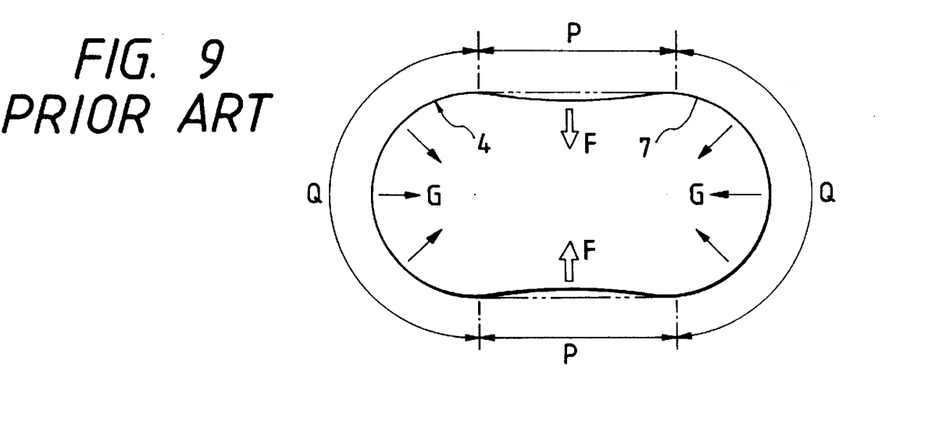
FIG. 9 is a view showing a state of elastic deformation of the conventional grommet when it is fitted in the through-hole in the panel.

In the above conventional grommet 1, however, when fitting the fitting groove 6 of the panel fitting portion 4 in the through-hole 9 in the panel 8, there are exerted forces G which urge the arcuate portions Q of the panel fitting portion 4 inwardly as shown in FIG. 9, so that the straight portions P of the panel fitting portion 4 and straight portions of a lip-like seal portion 6a of the fitting groove 6 are much deformed inwardly as shown in FIGS. 8(a), 8(c), 9 and 10(c), and as a result the pressure of contact of the panel fitting portion 4 of the grommet 1 with the through-hole 9 in the panel 8 is reduced, and when an external load, such as a twisting force, is applied to the wire harness W, it is possible that a gap is formed between the panel fitting portion 4 of the grommet 1 and the through-hole 9 in the panel 8, and water or the like may intrude through this gap.

SUMMARY OF THE INVENTION

Therefore, this invention has been made in order to overcome this problem, and an object of the invention is to provide a grommet in which straight portions of a panel fitting portion of a substantially oval tubular shape are more effectively prevented from being deformed after the grommet is attached to a panel, and also a waterproof ability of the panel fitting portion is enhanced.

According to the invention, there is provided a grommet comprising a cylindrical wire fitting portion for fitting on and holding a wire harness passing therethrough; and a panel fitting portion of a substantially oval tubular shape for being elastically deformed to be fitted in a through-hole of an oval shape formed through a panel, wherein straight portions of an abutment flange portion of the panel fitting portion are convex to be larger in thickness than arcuate portions of the abutment flange portion.

DETAILED DESCRIPTION OF THE PREFERRED EMBODIMENT

A preferred embodiment of the present invention will now be described with reference to the drawings.

FIGS. 1(a) to 1(d), 4 and 5(a) to 5(d) show a grommet of the preferred embodiment of the present invention, and this grommet is used, for example, when passing a wire harness W through a panel 20 separating a passengers' compartment of an automobile from an engine room. As shown in FIGS. 1(a) to 1(d), the grommet 10 is integrally molded of a rubber material (soft elastic material), and includes a cylindrical wire fitting portion 11 for fitting on and holding the wire harness W passing therethrough, and a panel fitting portion 13 of a substantially oval tubular shape for being compressively elastically deformed to be fitted in a through-hole 21 of an oval shape formed through the panel 20. Straight portions (designated by P in FIG. 1(d)) of an abutment flange portion 16 of the panel fitting portion 13 are larger in thickness to arcuate portions (designated by Q in FIG. 1(d)) of the abutment flange portion 16. Namely, the panel fitting portion 13 is formed integrally with the wire fitting portion 11 through a wall portion 12 of a substantially oval shape, and has a slanting guide portion 14 to be guided to the through-hole 21 in the panel 20, an annular fitting groove 15 of a substantially U-shaped cross-section to be fitted in the through-hole 21, and the abutment flange portion 16 to be abutted against that portion of the panel 20 around the through-hole 21.

Figure 1A:
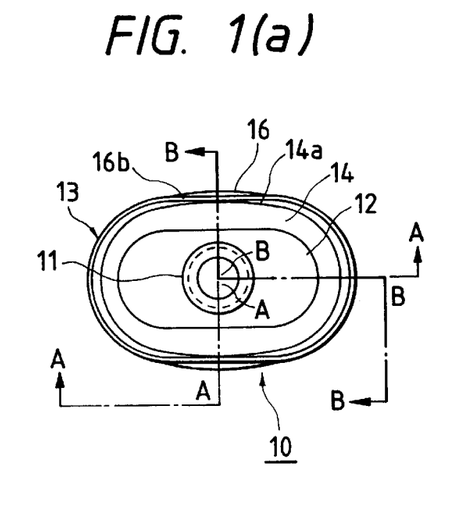
FIG. 1(a) is a rear view of a preferred embodiment of a grommet of the present invention.
Figure 1B:
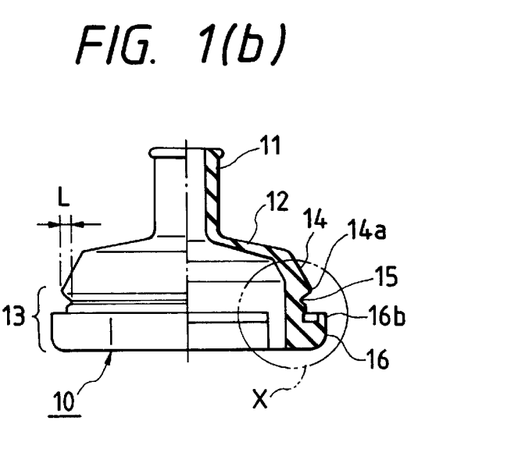
FIG. 1(b) is a cross-sectional view taken along the line A—A of FIG. 1(a)
Figure 1C:
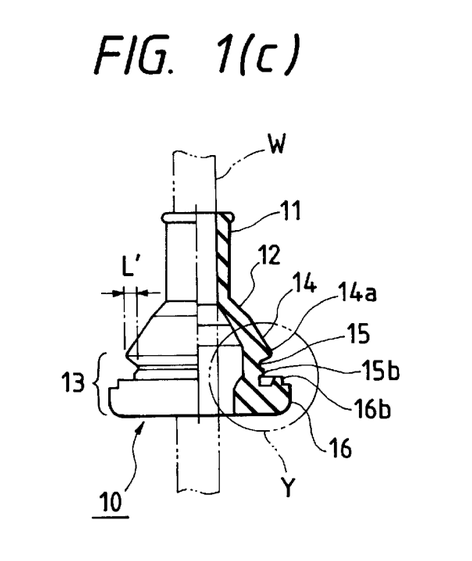
FIG. 1(c) is a cross-sectional view taken along the line B—B of FIG. 1(a)
Figure 2:
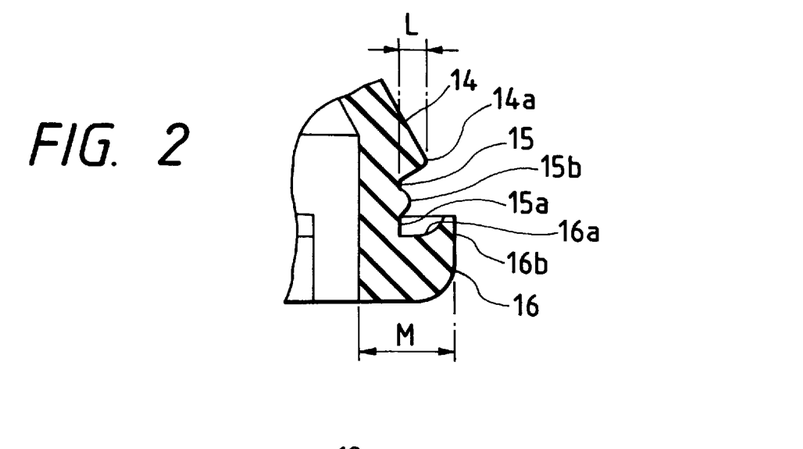
FIG. 2 an enlarged, cross-sectional view of a portion X of FIG. 1(b)
Figure 3:
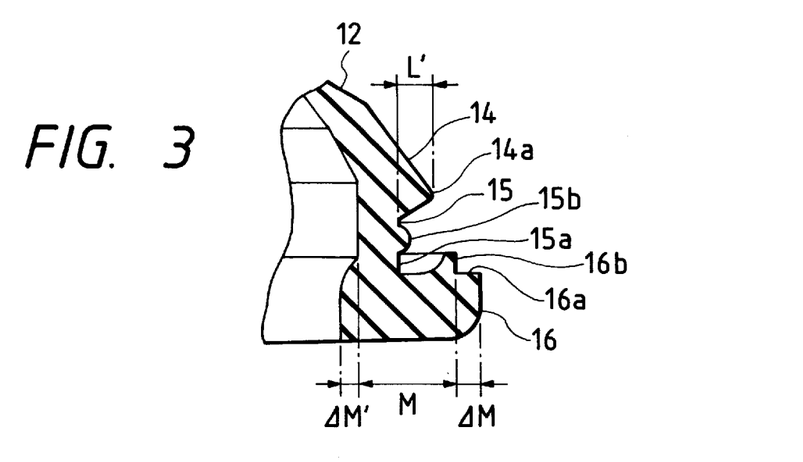
FIG. 3 is an enlarged, cross-sectional view of a portion Y of FIG. 1(c)

The thickness (that is, a thickness L' between a bottom surface 15a of the fitting groove 15 and a distal end 14a of the slanting guide portion 14 in FIGS. 1(c) and 3) of straight portions P of the distal end portion 14a of the slanting guide portion 14 is larger outwardly than the thickness (that is, a thickness L between the bottom surface 15a of the fitting groove 15 and the distal end 14a of the slanting guide portion 14 in FIGS. 1(b) and 2) of arcuate portions Q of the distal end portion 14 in such a manner that these straight portions P are outwardly arcuately convex (Therefore, L'>L is provided). Also, the thickness (designated by M+ΔM in FIGS. 3 and 4) of straight portions P of the abutment flange portion 16 is larger outwardly than the thickness (designated by M in FIG. 2 and 4) of arcuate portions Q thereof in such a manner that these straight portions P are outwardly arcuately convex (that is, these straight portions are thickened outwardly arcuately by an amount indicated by hatching in FIG. 4 as compared with the conventional construction).

Figure 1D:
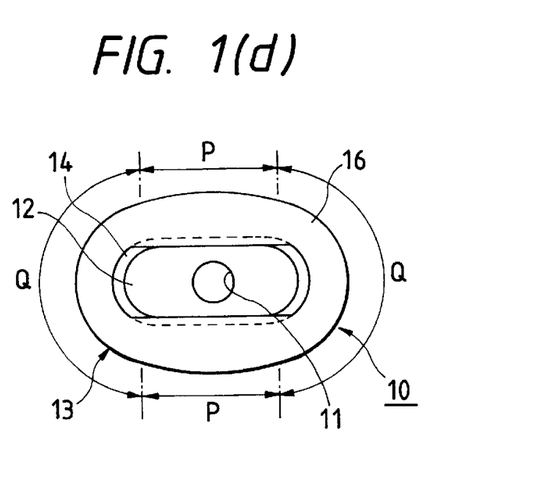
FIG. 1(d) is a front-elevational view of the grommet.
Figure 4:
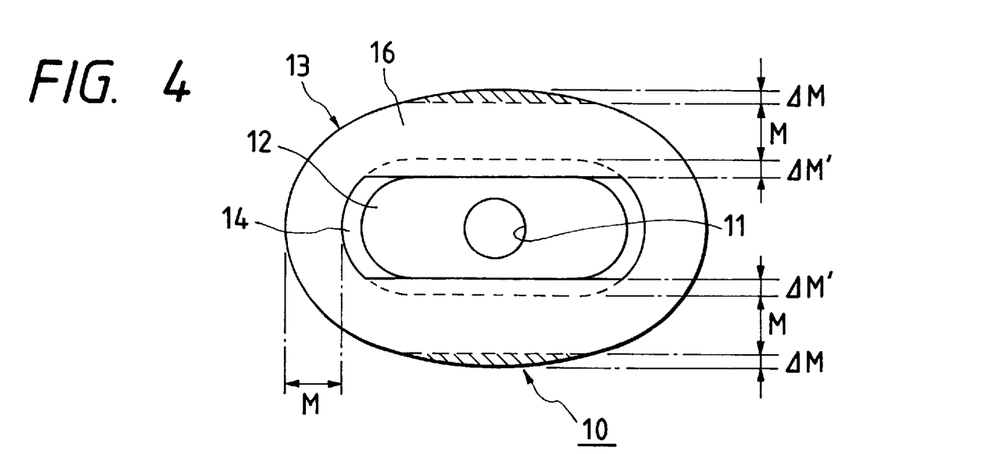
FIG. 4 is a front-elevational view showing a comparison between the above grommet and a conventional grommet.

As shown in FIGS. 1(d), 3 and 4, further, the straight portions P of the abutment flange portion 16 are thickened inwardly by an amount ΔM' as compared with the arcuate portions Q thereof having the thickness M (This linearly, inwardly-thickened portion is indicated in a broken line in FIG. 4). An annular lip-like seal portion 15b is formed integrally on a substantially widthwise-central portion of the bottom surface 15a of the fitting groove 15, and an annular lip-like seal portion 16b is formed integrally on a panel abutment surface 16a of the abutment flange portion 16, and is disposed on a substantially widthwise-central portion of the panel abutment surface 16a at the thickened portions of the abutment flange portion 16. As shown in FIG. 1(a), the seal portion 16b is formed to extend along the outer edge portions of the arcuate portions Q of the abutment flange portion 16.

Figure 5A:
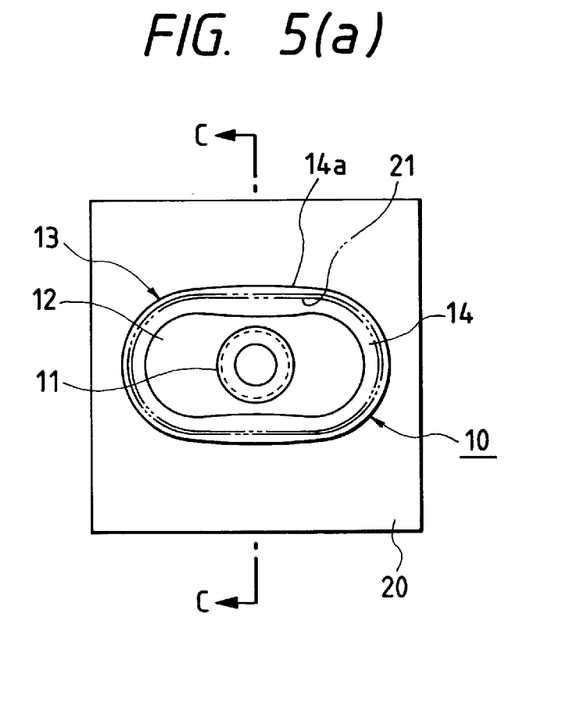
FIG. 5(a) is a rear view of the grommet fitted in a through-hole of an oval shape in a panel.
Figure 5B:
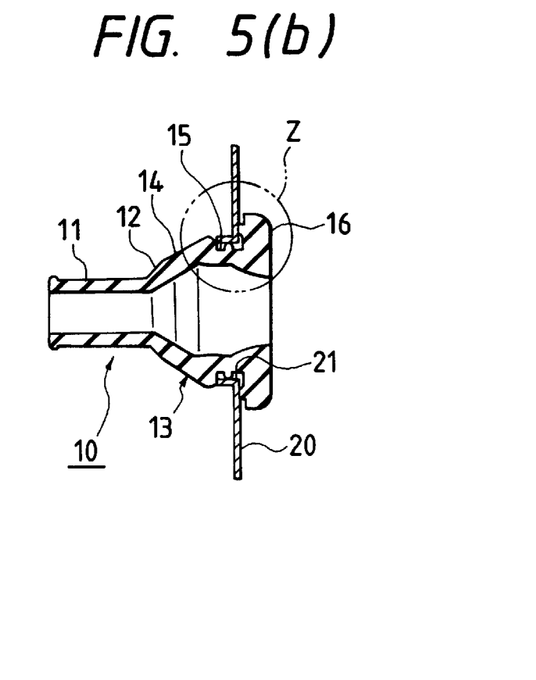
FIG. 5(b) is a cross-sectional view taken along the line C—C of FIG. 5(a)
Figure 5C:
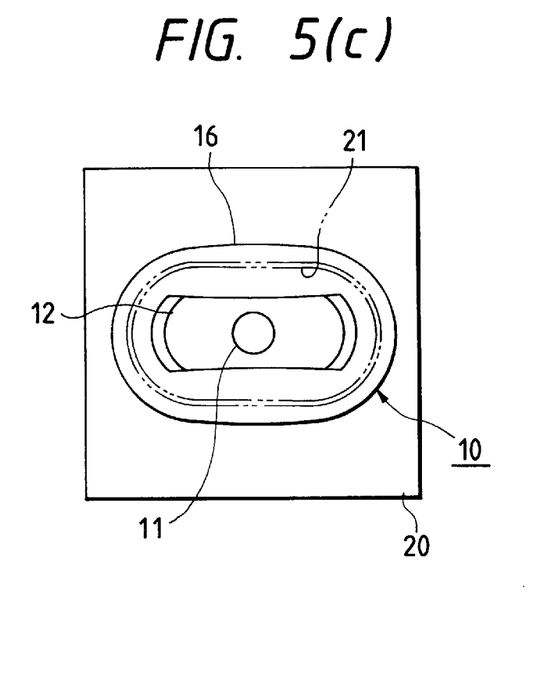
FIG. 5(c) is a front-elevational view of the grommet fitted in the through-hole in the panel.

As shown in FIGS. 5(a) and 5(b), the through-hole 21 in the panel 20 is formed by burring into an oval tubular shape having a predetermined width, and projects perpendicularly from the plane of the panel 20. The burred portion, forming the through-hole 21, is fitted in the fitting groove 15, and is held between the distal end portion 14a of the slanting guide portion 14 of the panel fitting portion 13 and the abutment flange portion 16, and at this time the seal portion 16b on the panel abutment surface 16a of the abutment flange portion 16 is pressed against that portion of the panel 20 around the through-hole 21.

Figure 10A:
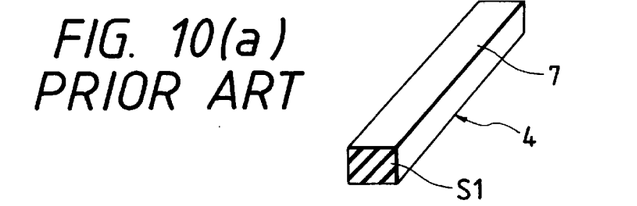
FIG. 10(a) is a schematic, perspective view of an important portion of the conventional grommet.
Figure 10B:
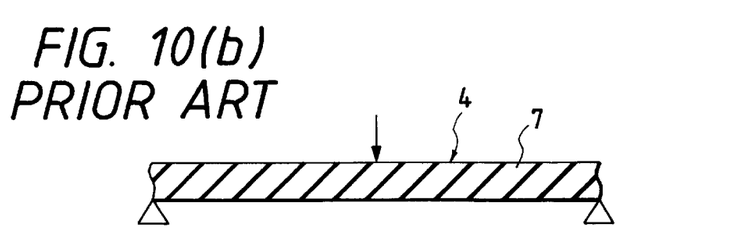
FIG. 10(b) is view showing this important portion before it is elastically deformed.
Figure 10C:
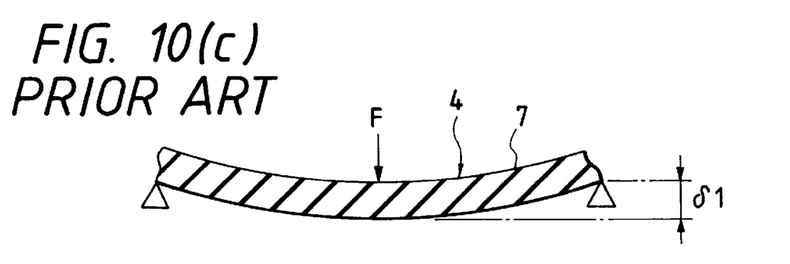
FIG. 10(c) is a view showing this important portion after it is elastically deformed.

In the grommet 10 of this embodiment, the wire harness W is fitted in and held by the wire fitting portion 11, and then the slanting guide portion 14 is inserted into the through-hole 21 in the panel 20, and the fitting groove 15 of the panel fitting portion 13 is fitted in the through-hole 21, and by doing so, the grommet 10 can be attached to the panel 20 without forming any gap therebetween, as shown in FIGS. 5(a) to 5(d). At this time, since the straight portions P of the abutment flange portion 16 have an arcuate cross-sectional shape (S1+ΔS in FIG. 6(a)) as compared with the conventional straight portions having a uniform rectangular cross-sectional shape (S1 in FIG. 10(a)), the straight portions P are less liable to be flexed inwardly, and as can be seen from FIGS. 6(c) and 10(c), the amount δ2 of inward flexing of the straight portion P of the abutment flange portion 16 is smaller than the amount δ1 of inward flexing of the conventional straight portion (δ1>δ2).

Besides, the distal end portion 14a of the slanting guide portion 14 of the panel fitting portion 13 has such a configuration that the straight portions P thereof are outwardly arcuately convex in a larger amount than the arcuate portions Q thereof (In the conventional construction, such a distal end portion has a uniform cross-sectional shape), and therefore when fittingly attaching the grommet 10 to the panel 20, the amount of flexing due to the inward deformation of the straight portions P of the slanting guide portion 14 of the panel fitting portion 13 can be reduced, and even if the straight portions are slightly deformed, there is obtained a greater pressure of contact between the panel fitting portion 13 and the through-hole 21 since the amount of projecting of the distal end portion 14a of the slanting guide portion 14 of the panel fitting portion 13 is larger as compared with the conventional construction, thereby enhancing the water-proof and soundproof effects. At this time, the seal portion 15b on the bottom surface 15a of the fitting groove 15 and the seal portion 16b on the panel abutment surface 16a of the abutment flange portion 16 are held in intimate contact with that portion of the panel 20 around the through-hole 21 in a double manner, and therefore the sealing effect of the grommet 10 is further enhanced.

Figure 5D:
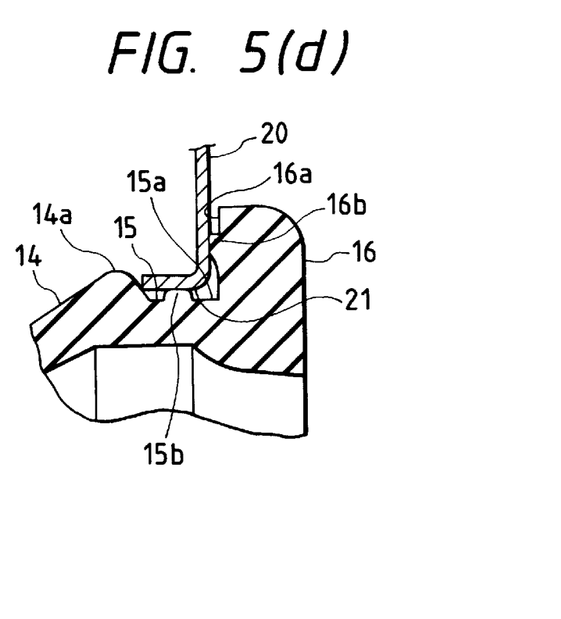
FIG. 5(d) is an enlarged, cross-sectional view of a portion Z of FIG. 5(b)
Figure 6A:
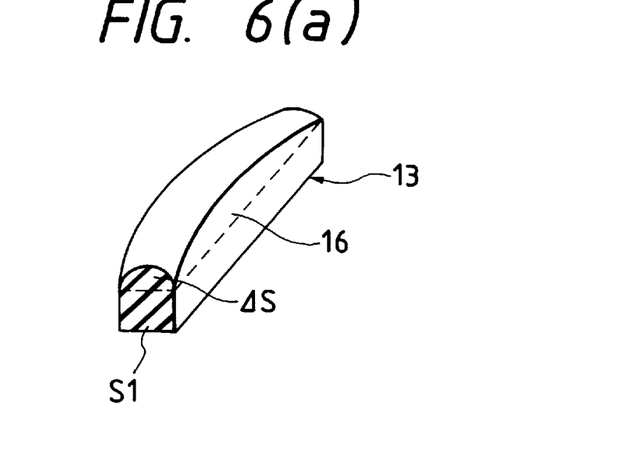
FIG. 6(a) is a schematic, perspective view of an important portion of the grommet.
Figure 6B:
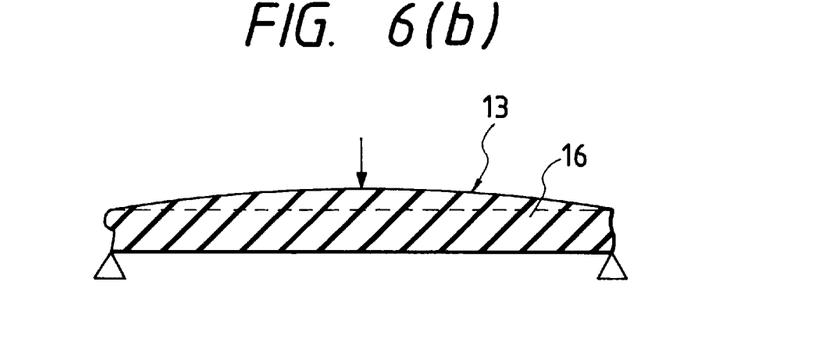
FIG. 6(b) is a view showing this important portion before it is elastically deformed.
Figure 6C:
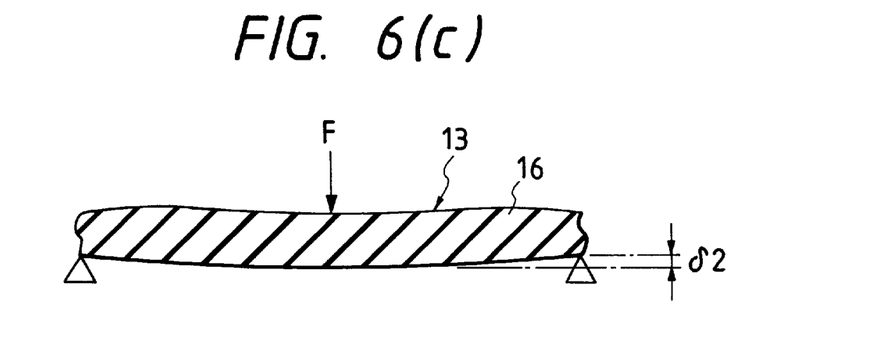
FIG. 6(c) is a view showing this important portion after it is elastically deformed.

Besides, as shown in FIGS. 5(b) and 5(d), the upper and lower straight portions P of the abutment flange portion 16 are thickened inwardly as compared with the right and left arcuate portions Q thereof, and therefore when fittingly attaching the grommet 10 to the panel 20, the amount of inward flexing of the distal end portion 14a of the slanting guide portion 14 of the panel fitting portion 13, as well as the amount of inward flexing of each straight portion P of the abutment flange portion 16, can be suppressed to a smaller level, and the pressure of contact of the fitting groove 15 of the panel fitting portion 13 of the grommet 10 with the through-hole 21 in the panel 20 can be increased. As a result, even if an external load, such as a twisting force, is applied to the wire harness W held by the grommet 10, a gap will not be formed between the panel fitting portion 13 of the grommet 10 and the through-hole 21 in the panel 20, and the good sealing effect is always maintained.

In this embodiment, although the grommet, having the wire fitting portion, the wall portion and the panel fitting portion, is molded into an integral construction with the rubber material, the soft elastic material is not limited to such a rubber material, but the grommet may be formed into an integral construction with any other suitable soft elastic material such as an elastomer. Although the grommet is adapted to be fitted in the panel through-hole subjected to burring, the grommet may be fitted in a through-hole formed by cutting through a panel and not subjected to burring.

As described above, in the grommet of the invention, even if there are exerted forces which urge the arcuate portions of the abutment flange portion of the panel fitting portion inwardly when fittingly attaching the grommet to the panel, the amount of inward deformation of the straight portions of the abutment flange portion of the panel fitting portion is suppressed to a small level, and a gap will not be formed between the through-hole in the panel and the abutment flange portion of the panel fitting portion of the grommet.

What is claimed is:

1. A one piece grommet comprising:

a cylindrical wire fitting portion for fitting on and holding a wire harness passing therethrough; and a panel fitting portion of a substantially oval tubular shape for being elastically deformed to be fitted in a through-hole of an oval shape formed through a panel, said panel fitting portion including an abutment flange portion which overlaps and abuts against a sealing surface of said panel over a predetermined overlapping distance;

wherein straight portions of said abutment flange portion are convex to be larger in thickness than arcuate portions of said abutment flange portion such that said overlapping distance is greater for said straight portions than for said arcuate potions.

2. The grommet according to claim 1, wherein straight portions of a distal end portion of a slanting guide portion of said panel fitting portion are convex to be larger in thickness than arcuate portions of said distal end portion.

3. The grommet according to claim 1, wherein said panel fitting portion includes a slanting guide portion to be guided to the through-hole in said panel, a fitting groove to be fitted in the through-hole, and said abutment flange portion to be abutted against the portion of said panel around the through-hole, and wherein straight portions of a distal end portion of said slanting guide portion are outwardly convex to be larger in thickness than arcuate portions of said distal end portion, and the straight portions of said abutment flange portion are outwardly convex to be larger in thickness than the arcuate portions of said abutment flange portion.

4. The grommet according to claim 3, wherein a seal portion is formed on a substantially widthwise-central portion of a bottom surface of said fitting groove, and another seal portion is formed on a panel abutment surface of said abutment flange portion, and is disposed on a substantially widthwise-central portion of said panel abutment surface at the portions of said abutment flange portion that are larger in thickness than arcuate portions of said abutment flange position.

5. The grommet according to claim 3, wherein the straight portions of said abutment flange portion are further inwardly convex to be further larger in thickness than the arcuate portions of said abutment flange portion.

* * * * *